(12) United States Patent
Kawada

(10) Patent No.: US 7,283,312 B2
(45) Date of Patent: Oct. 16, 2007

(54) FISHEYE LENS UNIT

(75) Inventor: Mayumi Kawada, Nagoya (JP)

(73) Assignee: Elmo Company, Limited (JP)

( * ) Notice: Subject to any disclaimer, the term of this patent is extended or adjusted under 35 U.S.C. 154(b) by 0 days.

(21) Appl. No.: 11/411,658

(22) Filed: Apr. 25, 2006

(65) Prior Publication Data

US 2007/0139793 A1   Jun. 21, 2007

(30) Foreign Application Priority Data

Dec. 16, 2005   (JP) .............................. 2005-363503

(51) Int. Cl.
  *G02B 13/06* (2006.01)
  *G02B 13/04* (2006.01)
(52) U.S. Cl. ...................... 359/725; 359/749
(58) Field of Classification Search ................ 359/725, 359/749, 751, 752, 786, 787
See application file for complete search history.

(56) References Cited

U.S. PATENT DOCUMENTS

| | | | | |
|---|---|---|---|---|
| 4,525,038 A | * | 6/1985 | Muller | 359/753 |
| 5,434,713 A | * | 7/1995 | Sato | 359/725 |
| 5,724,193 A | * | 3/1998 | Hirakawa | 359/691 |
| 6,987,623 B2 | * | 1/2006 | Shibayama | 359/691 |
| 7,023,628 B1 | * | 4/2006 | Ning | 359/781 |

FOREIGN PATENT DOCUMENTS

| | | |
|---|---|---|
| JP | 2002-244031 | 8/2002 |
| JP | 2003-232998 | 8/2003 |
| JP | 2004-102162 | 4/2004 |
| JP | 2005-227426 | 8/2005 |

* cited by examiner

*Primary Examiner*—David N. Spector
(74) *Attorney, Agent, or Firm*—Ostrolenk, Faber, Gerb & Soffen, LLP

(57) ABSTRACT

To provide a technique to constitute a fisheye lens unit with a small number of lenses. A fisheye lens unit uses a predetermined projection method, wherein a variation for the predetermined projection method is not less than the variation for an equidistant projection method, the variation being expressed by an increment of an image height in relation to an increment of an incident angle at a predetermined incident angle. The fisheye lens unit includes: a first lens group provided on an object side; a second lens group provided on an image side; and an aperture stop provided between the first lens group and the second lens group. The first lens group consists of three or four lenses, the second lens group consists of two or three lenses including a final lens provided on the furthest image side of the second lens group, and the final lens is an aspheric lens that has an aspheric shape on at least one of two surfaces of the aspheric lens.

5 Claims, 13 Drawing Sheets

Surface Data f=1.15    Fno.=2.8   Field angle 2ω = 180°

| Surface no. i | Radius of curvature Ri | Surface separation Di | Refractive index Ndi | Abbe number νdi | |
|---|---|---|---|---|---|
| 1 | 14.621 | 0.95 | 1.7725 | 49.6 | Lens L1 |
| 2 | 4.286 | 2.347 | – | – | |
| 3 | Infinity | 0.76 | 1.7725 | 49.6 | Lens L2 |
| 4 | 3.506 | 3.919 | – | – | |
| 5 | -9.162 | 2.6 | 1.7847 | 25.7 | Lens L3 |
| 6 | -5.634 | 4.392 | – | – | |
| 7 | Infinity | 2.064 | – | – | Aperture stop |
| 8 | 3.524 | 3.05 | 1.5163 | 64.1 | Lens L4 |
| 9 | -2.892 | 0.76 | 1.6727 | 32.1 | Lens L5 |
| 10 | 5.711 | 0.238 | – | – | |
| 11 * | 3.566 | 2.6 | 1.5500 | 75.0 | Lens L6 |
| 12 * | -3.730 | 0.881 | – | – | |
| 13 | Infinity | 1.5 | 1.5163 | 64.1 | Optical element |

S11 Aspheric coefficient

| K | -3.789275E+00 |
| A4 | 1.597659E-03 |
| A6 | -2.473094E-04 |
| A8 | -1.055495E-05 |

S12 Aspheric coefficient

| K | -9.658789E-01 |
| A4 | 3.756718E-03 |
| A6 | -1.043419E-05 |
| A8 | 0 |

Fig.4(A) Spherical Aberration
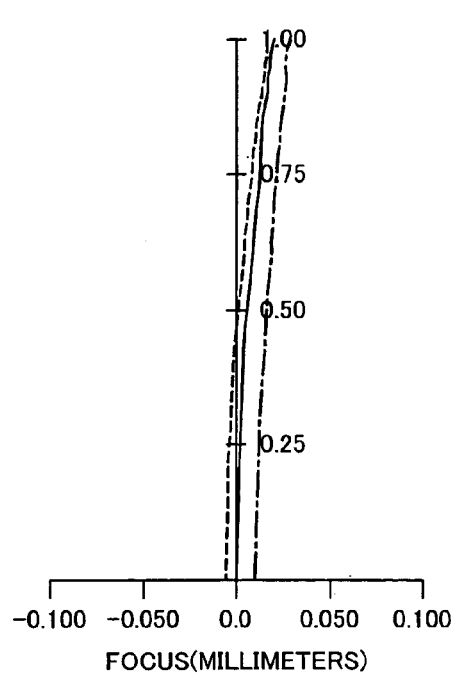
Fig.4(B) Astigmatism
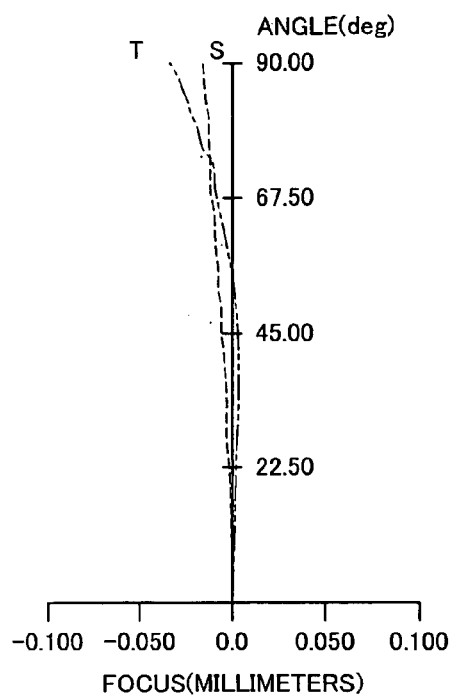
Fig.5(A) Distortion (f·tan θ)
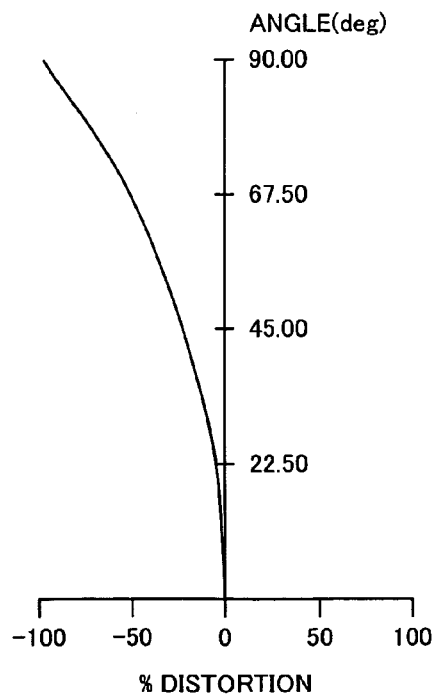
Fig.5(B) Distortion (f·θ)
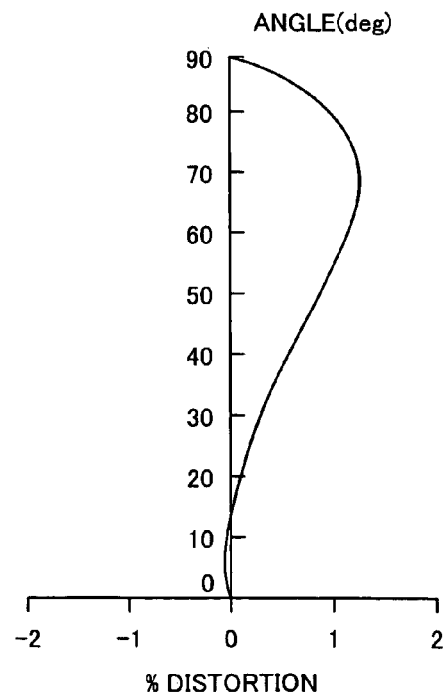

90°

60°

30°

0°

Surface Data
f=1.15   Fno.=2.8   Field angle 2ω=180°

| Surface no. i | Radius of curvature Ri | Surface separation Di | Refractive index Ndi | Abbe number νdi | |
|---|---|---|---|---|---|
| 1 | 17.399 | 0.95 | 1.7725 | 49.6 | Lens L1 |
| 2 | 4.140 | 2.697 | – | – | |
| 3 | -17.006 | 0.81 | 1.7725 | 49.6 | Lens L2 |
| 4 | 4.970 | 1.636 | – | – | |
| 5 | -20.280 | 3.8 | 1.8467 | 23.8 | Lens L3 |
| 6 | -6.387 | 4.762 | – | – | |
| 7 | Infinity | 0.325 | – | – | Aperture stop |
| 8 | 3.849 | 1.57 | 1.4875 | 70.2 | Lens L4 |
| 9 | 6.902 | 1 | – | – | |
| 10 * | 8.954 | 1.71 | 1.5500 | 75.0 | Lens L5 |
| 11 | -2.819 | 0.881 | – | – | |
| 12 | Infinity | 1.5 | 1.5163 | 64.1 | Optical element |

S10 Aspheric coefficient

| K | -1.000000E+02 |
|---|---|
| A4 | -6.128435E-03 |
| A6 | -2.238836E-03 |
| A8 | 0 |

Fig.9(A) Spherical Aberration
Fig.9(B) Astigmatism
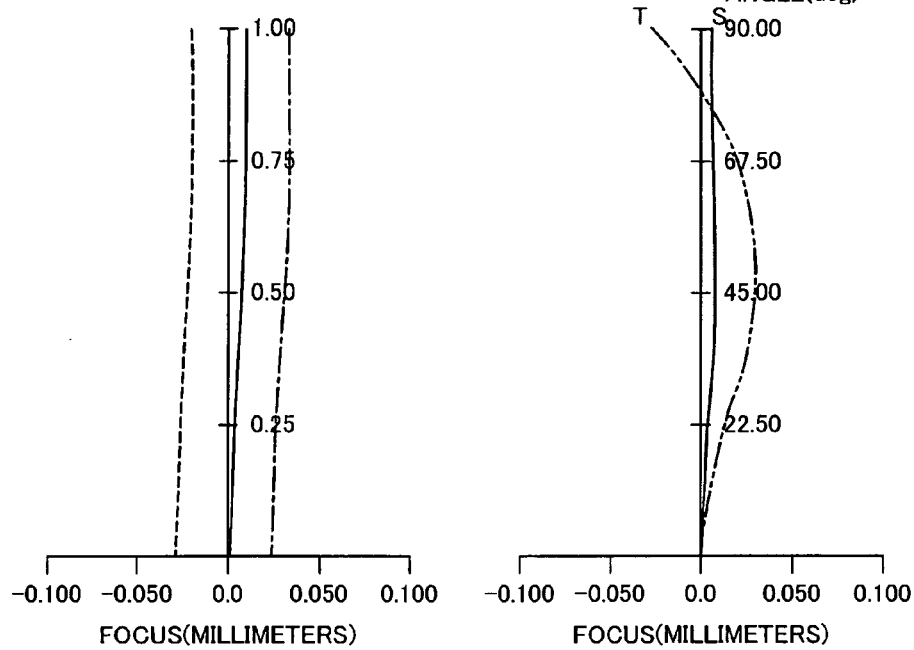
Fig.10(A) Distortion (f·tan θ)
Fig.10(B) Distortion (f·θ)
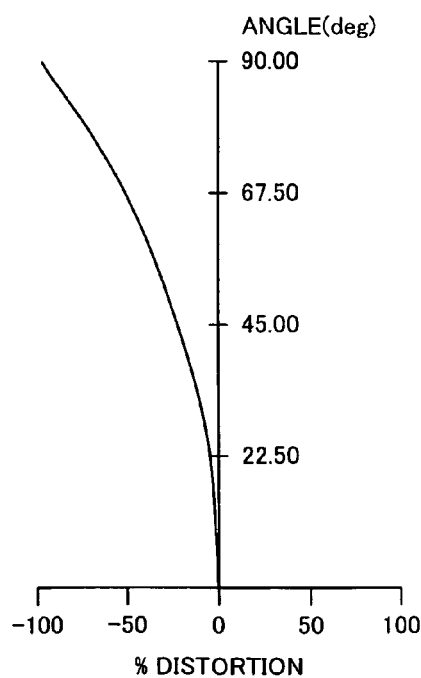
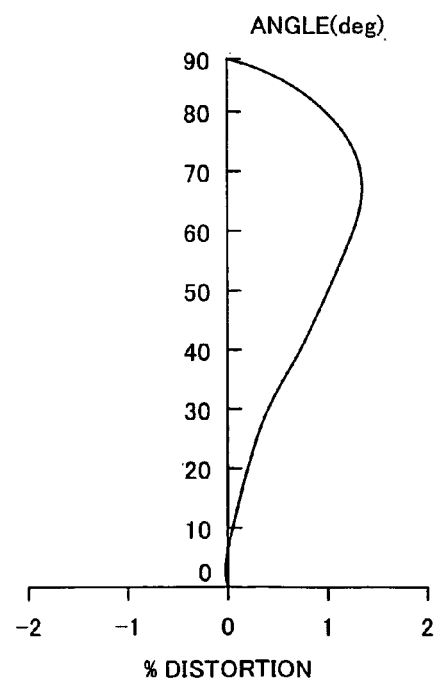

Fig.11(A)
90°
TANGENTIAL 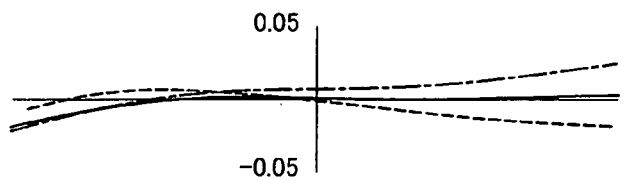
SAGITTAL 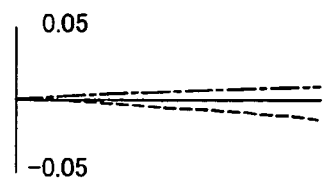
Fig.11(B)
60°
TANGENTIAL 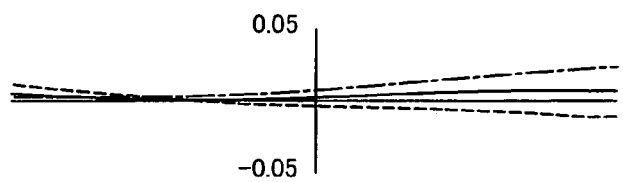
SAGITTAL 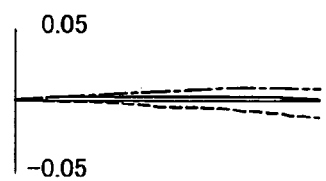
Fig.11(C)
30°
TANGENTIAL 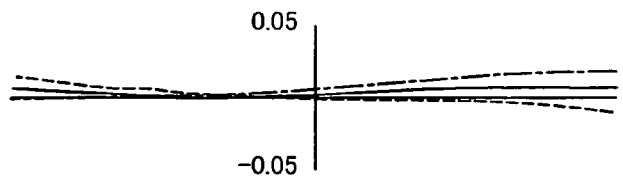
SAGITTAL 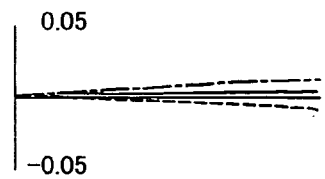
Fig.11(D)
0°
TANGENTIAL 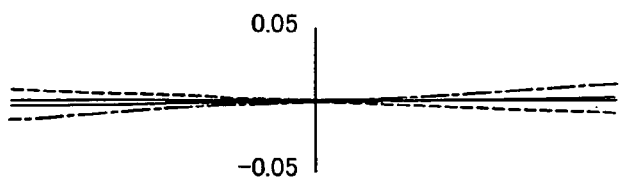
SAGITTAL 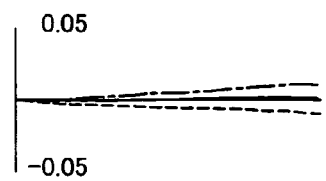

Surface Data f=1.04  Fno.=2.8  Field angle 2ω=180°

| Surface no. i | Radius of curvature Ri | Surface separation Di | Refractive index Ndi | Abbe number νdi | |
|---|---|---|---|---|---|
| 1 | 13.718 | 0.95 | 1.7725 | 49.6 | Lens L1 |
| 2 | 4.288 | 2.347 | – | – | |
| 3 | Infinity | 0.76 | 1.7725 | 49.6 | Lens L2 |
| 4 | 3.264 | 2.272 | – | – | |
| 5 | −4.187 | 1.2 | 1.6477 | 33.8 | Lens L3 |
| 6 | −5.804 | 1.281 | – | – | |
| 7 | −47.762 | 2.000 | 1.7015 | 41.2 | Lens L4 |
| 8 | −6.029 | 5.201 | – | – | |
| 9 | Infinity | 2.064 | – | – | Aperture stop |
| 10 | 3.425 | 3.050 | 1.5163 | 64.1 | Lens L5 |
| 11 | −2.708 | 0.760 | 1.6727 | 32.1 | Lens L6 |
| 12 | 4.479 | 0.238 | – | – | |
| 13 * | 3.428 | 2.4 | 1.5500 | 75.0 | Lens L7 |
| 14 * | −2.425 | 0.881 | – | – | |
| 15 | Infinity | 1.5 | 1.5163 | 64.1 | Optical element |

S13 Aspheric coefficient

| K | −2.383339E+00 |
|---|---|
| A4 | −7.263885E−03 |
| A6 | −5.369248E−04 |
| A8 | −8.272332E−05 |

S14 Aspheric coefficient

| K | −6.072975E−01 |
|---|---|
| A4 | 9.054576E−03 |
| A6 | −1.158391E−03 |
| A8 | 0.000000E+00 |

Spherical Aberration

Astigmatism

Distortion (f·tan θ)

Distortion (3·f·tan(θ/3))

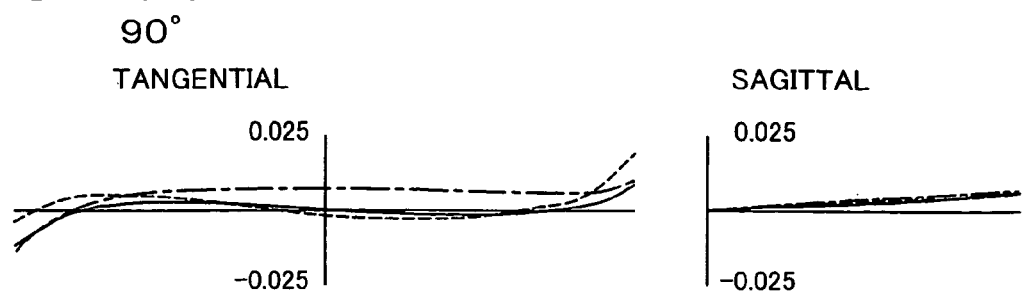
Fig.16(A) 90°
Fig.16(B) 60°
Fig.16(C) 30°
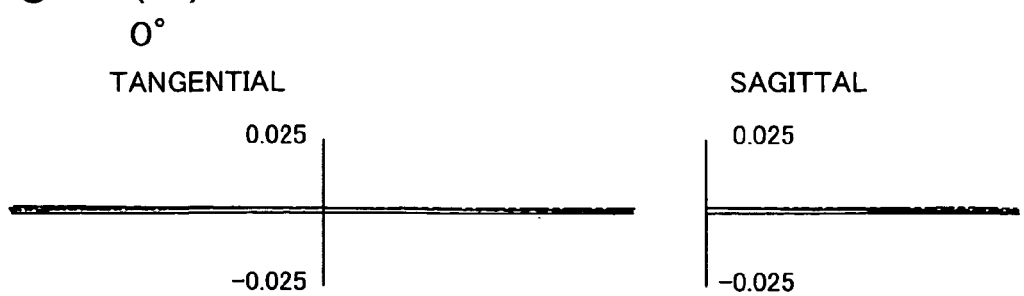
Fig.16(D) 0°

Surface Data f=1.05  Fno.=2.8  Field angle 2ω=180°

| Surface no. i | Curvature radius Ri | Surface separation Di | Refractive index Ndi | Abbe number νdi | |
|---|---|---|---|---|---|
| 1 | 17.269 | 0.95 | 1.7725 | 49.6 | Lens L1 |
| 2 | 5.377 | 2.756 | – | – | |
| 3 | 64.919 | 0.76 | 1.7725 | 49.6 | Lens L2 |
| 4 | 4.231 | 4.528 | – | – | |
| 5 | -5.614 | 2.6 | 1.8335 | 24.0 | Lens L3 |
| 6 * | -5.328 | 6.402 | – | – | |
| 7 | Infinity | 0.894 | – | – | Aperture stop |
| 8 | 2.973 | 3.04 | 1.5163 | 64.1 | Lens L4 |
| 9 | -2.294 | 0.76 | 1.6727 | 32.1 | Lens L5 |
| 10 | 3.835 | 0.238 | – | – | |
| 11 * | 3.085 | 2.6 | 1.5500 | 75.0 | Lens L6 |
| 12 * | -2.640 | 0.881 | – | – | |
| 13 | Infinity | 1.5 | 1.5163 | 64.1 | Optical element |

S6 Aspheric coefficient

| K | 0.000000E+00 |
|---|---|
| A4 | -4.114687E-06 |
| A6 | 1.349338E-05 |
| A8 | 1.611533E-07 |

S11 Aspheric coefficient

| K | -3.337709E+00 |
|---|---|
| A4 | -3.132327E-03 |
| A6 | 3.728470E-04 |
| A8 | -1.699890E-04 |

S12 Aspheric coefficient

| K | -9.654421E-01 |
|---|---|
| A4 | 4.263829E-03 |
| A6 | -3.809879E-04 |
| A8 | 0 |

Spherical Aberration

Astigmatism

Distortion (f·tan θ)

Distortion (3·f·tan(θ/3))

90°

60°

30°

0°

FISHEYE LENS UNIT

CROSS REFERENCE

The present application is based on, and claims priority from, Japanese Application No. 2005-363503 filed Dec. 16, 2005, the disclosure of which is herein incorporated by reference.

BACKGROUND

1. Technical Field

The present invention relates to a fisheye lens unit.

2. Related Art

Fisheye lens units including a plurality of lenses that constitute a fisheye lens are incorporated on still cameras and monitoring cameras, and are widely used to photograph wide area spaces.

Here, the fisheye lens represents a lens having a field angle of 160 degrees or greater, and normally having a field angle of 180 degrees or greater. The fisheye lens differs from a wide angle lens in that distortion is generated intentionally.

A specified projection method is used for the fisheye lens. For example, the following kinds of projection methods are well known.

(1) Orthogonal projection method - - - $y = f \cdot \sin \theta$
(2) Equisolid angle projection method - - - $y = 2 \cdot f \cdot \sin(\theta/2)$
(3) Equidistant projection method - - - $y = f \cdot \theta$
(4) Stereographic projection method - - - $y = 2 \cdot f \cdot \tan(\theta/2)$ Here, f is the focal length of the fisheye lens, $\theta$ is the incident angle of light incident to the fisheye lens, and y is the height of the image formed on the image surface (image height).

FIG. 1 shows a relationship of an incident angle and an image height according to the projection methods. The horizontal axis indicates the incident angle $\theta$ (radian), and the vertical axis indicates the image height y (mm). Curves C1 to C4 respectively represent the projection methods (1) through (4). However, in FIG. 1, for convenience, a focal length f is set to 1 mm. Note that, curves CA and CZ (described later) are also depicted in FIG. 1.

As shown in the drawing, near the incident angle of 90 degrees, a variation ($\Delta y/\Delta \theta$) represented by an increment $\Delta y$ of the image height y in relation to an increment $\Delta \theta$ of the incident angle $\theta$ becomes larger as it goes from the projection method (1) (curve C1) to the projection method (4) (curve C4). Namely, as it goes from the projection method (1) (curve C1) to the projection method (4) (curve C4), the ratio of the amount of information for the peripheral part inside the image increases. Therefore, if a large amount of information for peripheral part is required, it is preferable to use the projection methods (3) and (4) described above.

However, when using the projection methods (3) and (4), it was conventionally necessary to use about ten lenses for constituting the fisheye lens unit. Namely, when using the projection methods (3) and (4), it was relatively difficult to make the number of lenses smaller for constituting the fisheye lens unit.

SUMMARY

The present invention solves the above-described problem of conventional technology, and there is need to provide a technique to constitute a fisheye lens unit with a small number of lenses even when using a predetermined projection method, for which a variation expressed by an increment of an image height in relation to an increment of an incident angle at a predetermined incident angle is not less than the variation for an equidistant projection method.

At least part of the above and the other related objects is attained by an apparatus of the present invention. The apparatus is a fisheye lens unit that uses a predetermined projection method, wherein a variation for the predetermined projection method is not less than the variation for an equidistant projection method, the variation being expressed by an increment of an image height in relation to an increment of an incident angle at a predetermined incident angle. The fisheye lens unit comprises: a first lens group provided on an object side; a second lens group provided on an image side; and an aperture stop provided between the first lens group and the second lens group. The first lens group consists of three or four lenses, the second lens group consists of two or three lenses including a final lens provided on the furthest image side of the second lens group, and the final lens is an aspheric lens that has an aspheric shape on at least one of two surfaces of the aspheric lens.

In this apparatus, even though the predetermined projection method is used for which the above variation is not less than the variation for the equidistant projection method, the aspheric lens is used as the final lens provided on the furthest image side of the second lens group. Therefore, it is possible to constitute the fisheye lens unit with a relatively small number of lenses.

In the above apparatus, the aspheric lens may have the aspheric shape on each of the two surfaces of the aspheric lens.

Alternatively, the aspheric lens may have the aspheric shape on only one of the two surfaces of the aspheric lens.

By employing this configuration, it is possible to produce the aspheric lens relatively easily, compared with the case where the aspheric lens has an aspheric shape on each of the two surfaces.

In the above apparatus, it is preferable that a condition of $1.5 < H1/2Y < 2.5$ is satisfied. Here, H1 is an effective radius of an object side surface of a first lens provided on the furthest object side of the first lens group, and 2Y is a diameter of an image circle formed on an image surface by the fisheye lens unit.

By employing this configuration, it is possible to make the first lens smaller in diameter. It is also possible to obtain a high performance lens unit with little off-axis aberration.

In the above apparatus, it is preferable that a condition of $0.25 < H1/R1 < 0.5$ is satisfied. Here, H1 is an effective radius of an object side surface of a first lens provided on the furthest object side of the first lens group, and R1 is a radius of curvature of the object side surface of the first lens.

By employing this configuration, it is possible to produce the first lens relatively easily and to handle it relatively easily. It is also possible to obtain a high performance lens unit with little off-axis aberration.

In the above apparatus, it is preferable that a condition of $6.0<\Sigma D/2Y<8.0$ is satisfied. Here, $\Sigma D$ is a distance on an optical axis between an object side surface of a first lens provided on the furthest object side of the first lens group and an image surface, and 2Y is a diameter of an image circle formed on the image surface by the fisheye lens unit.

By employing this configuration, it is possible to make the lens unit more compact. It is also possible to obtain a high performance lens unit with little spherical aberration, coma aberration, astigmatism, chromatic aberration of magnification.

It should be noted that the present invention may be actualized by a diversity of applications such as a fisheye lens unit, an imaging apparatus including the fisheye lens unit, or a projection apparatus including the fisheye lens unit.

These and other objects, features, aspects, and advantages of the present invention will become more apparent from the following detailed description of the preferred embodiments with the accompanying drawings.

BRIEF DESCRIPTION OF THE DRAWINGS

FIGS. 4(A) and 4(B) show longitudinal aberration of the fisheye lens unit 100;

FIGS. 5(A) and 5(B) show distortion of the fisheye lens unit 100;

FIGS. 9(A) and 9(B) show longitudinal aberration of the fisheye lens unit 100B;

FIGS. 10(A) and 10(B) show distortion of the fisheye lens unit 100B;

FIGS. 11(A)-11(D) show transverse aberration of the fisheye lens unit

FIGS. 16(A)-16(D) show transverse aberration of the fisheye lens unit 100C;

DESCRIPTION OF THE PREFERRED EMBODIMENT

Embodiments of the present invention are discussed below based on examples in the following order.

A. First Embodiment

A-1. Configuration of Fisheye Lens Unit:
A-2. Characteristics of Fisheye Lens Unit:

B. Second Embodiment

B-1. Configuration of Fisheye Lens Unit:
B-2. Characteristics of Fisheye Lens Unit:

C. Third Embodiment

C-1. Configuration of Fisheye Lens Unit:
C-2. Characteristics of Fisheye Lens Unit:

D. Fourth Embodiment

D-1. Configuration of Fisheye Lens Unit:
D-2. Characteristics of Fisheye Lens Unit:

E. Evaluation Values of Fisheye Lens Unit

A. First Embodiment

Figures 2, 3A, 3B, 3C:
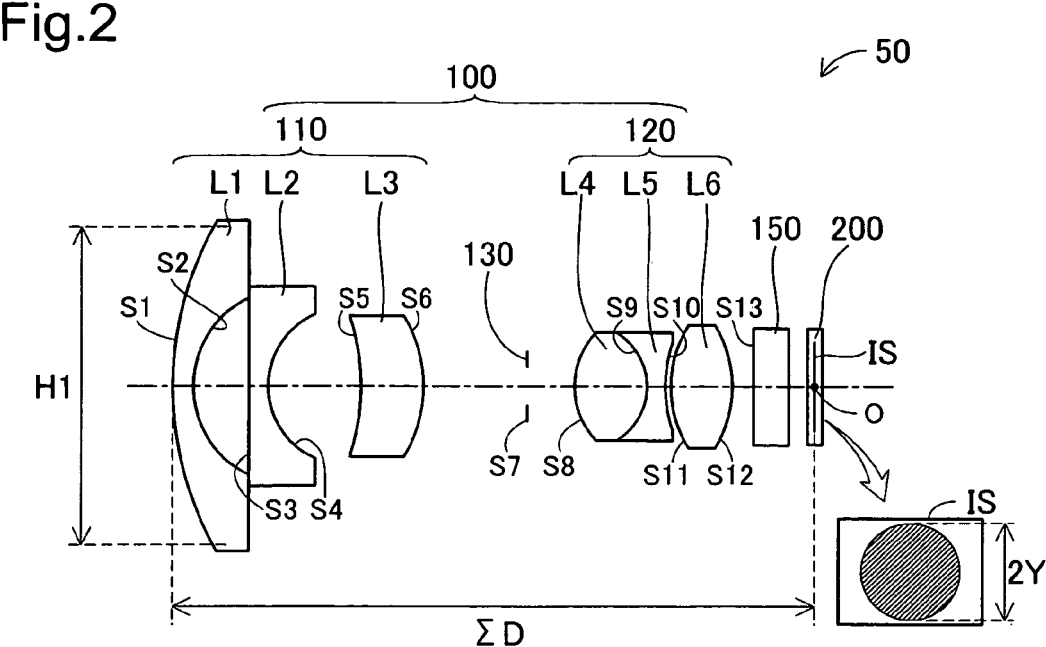
FIG. 2 shows basic configuration of an imaging apparatus 50 according to the first embodiment.
FIGS. 3(A)-3(C) show lens data of the fisheye lens unit 100.
Figure 6A:
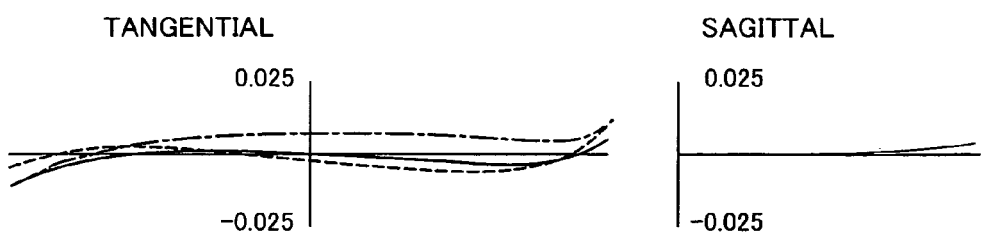
FIGS. 6(A)-6(D) show transverse aberration of the fisheye lens unit 100.
Figure 6B:
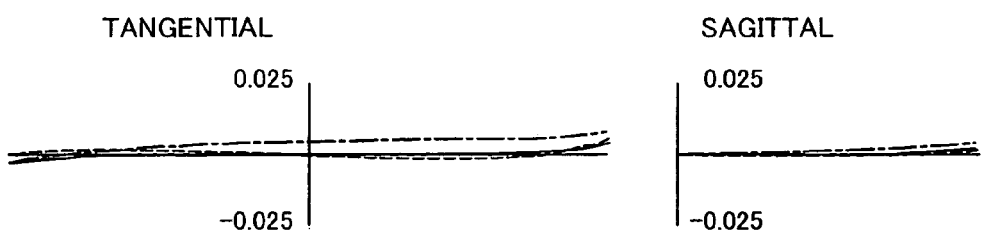
Figure 6C:
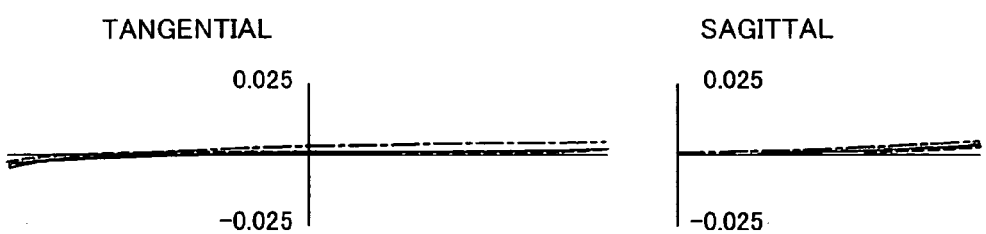
Figure 6D:

A-1. Configuration of Fisheye Lens Unit:

FIG. 2 shows basic configuration of an imaging apparatus 50 according to the first embodiment. As shown in the drawing, the imaging apparatus 50 includes a fisheye lens unit 100, a solid-state imaging device 200 such as a CCD (charge coupling device), and an optical element 150 provided between the fisheye lens unit 100 and the solid-state imaging device 200. The optical element 150 includes, for example, an optical filter, cover glass of the solid-state imaging device, or the like. The solid-state imaging device 200 has an image surface (imaging surface) IS.

Figure 1:
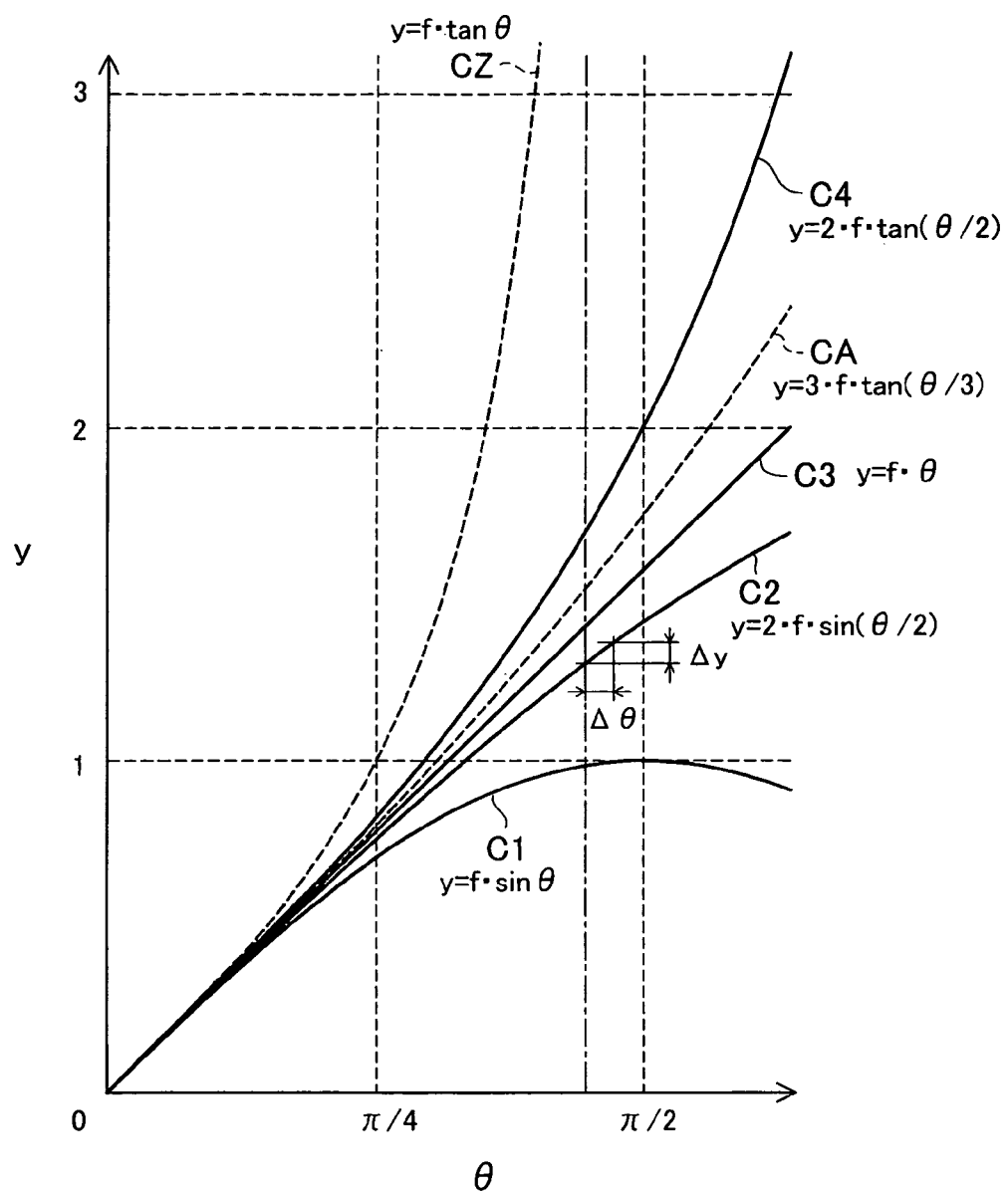
FIG. 1 shows a relationship of an incident angle and an image height according to the projection methods.

The fisheye lens unit (also called simply "lens unit" hereafter) 100 includes a plurality of lenses that constitute the fisheye lens. The equidistant projection method represented by $y=f\cdot\theta$ (see curve C3 in FIG. 1) is used for the lens unit 100 of this embodiment.

The lens unit 100 includes a first lens group 110 arranged on the object side, a second lens group 120 arranged on the image side, and an aperture stop 130 arranged between the first lens group 110 an the second lens group 120. The lens unit 100 further includes a lens holder (not illustrated) for holding the first lens group 110, the second lens group 120, and the aperture stop 130.

The first lens group 110 has a function of bending the incident bundle of light rays stepwise in a direction parallel to the optical axis, and of leading the bundle of light rays to the second lens group 120.

In this embodiment, the first lens group 110 is constituted by three lenses. The first lens L1 arranged at the furthest object side is a concave meniscus lens that has a convex surface on the object side and has a concave surface on the image side. The second lens L2 is a plano-concave lens that has a planar surface on the object side and has a concave surface on the image side. The third lens L3 arranged at the furthest object side is a convex meniscus lens that has a concave surface on the object side and a convex surface on the image side.

The second lens group 120 has the function of imaging the bundle of light rays that pass through the first lens group 110 onto the image surface IS, such that the principal ray is as parallel as possible in relation to the optical axis and the principal ray enters a predetermined image height position according to the incident angle of the principal ray.

In this embodiment, the second lens group 120 is constituted by three lenses. The fourth lens L4 arranged at the furthest object side is a biconvex lens that has convex surfaces on the object side and the image side. The fifth lens L5 is a biconcave lens that has concave surfaces on both the object side and the image side. The sixth lens L6 is an aspheric lens that has an aspheric shaped convex surface on the object side and the image side.

Note that the fourth lens L4 and the fifth lens L5 are joined. Specifically, the radius of curvature for the image side surface of the fourth lens L4 and the radius of curvature for the object side surface of the fifth lens L5 match. However, the refractive indexes of the two lenses L4 and L5 are mutually different.

FIGS. 3(A)-3(C) show lens data of the fisheye lens unit 100. FIG. 3(A) shows surface data for each lens that constitutes the fisheye lens unit 100.

Surface number i indicates the number of a surface of each lens that constitutes the lens unit 100. However, as indicated by surface numbers 7 and 13, surface numbers are also allocated to the aperture stop 130 and the optical element 150. Note that in FIG. 2, the surface number i is indicated by the symbol Si.

Radius of curvature Ri indicates a radius of curvature (mm) of a surface Si. The radius of curvature of a convex surface on the object side is represented by a positive number, and the radius of curvature of a concave surface on the object side is represented by a negative number.

Surface separation Di indicates a distance (mm) on the optical axis between a surface Si and a surface Si+1. Namely, if the surface number i indicates a object side surface of a lens, the surface separation Di represents the thickness on the optical axis of the lens, and if the surface number i indicates a image side surface of a lens, the surface separation Di represents the distance on the optical axis between the image side surface of the lens and a object side surface of an optical device (e.g. lens) provided in a subsequent stage.

Refractive index Ndi indicates a refractive index for the d-line (wavelength 587.6 nm) of a lens having a surface Si.

Abbe number vdi indicates an Abbe number of a lens having a surface Si. Note that the Abbe number vdi is a value representing the properties relating to dispersion of the lens or the like. The Abbe number vdi is represented by (nd−1) $(n_F-n_C)$. Here, nd, $n_C$ and $n_F$ represent the refractive indexes for d-line, C-line (wavelength 656.3 nm) and F-line (wavelength 486.1 nm), respectively.

In FIG. 3(A), the surface for which "*" is attached to the surface number i has an aspheric shape. As described previously, in this embodiment, each of the object side surface S11 and the image side surface S12 of the sixth lens L6 has an aspheric shape. The aspheric shape is represented by the following formula.

$$X = \frac{\frac{H^2}{R}}{1 + \sqrt{\left(1-(1+K)\cdot\left(\frac{H}{R}\right)^2\right)}} + A4\cdot H^4 + A6\cdot H^6 + A8\cdot H^8$$

Here, if the intersection of the aspheric surface and the optical axis is set to an origin point, H represents a distance from the origin point in the direction vertical to the optical axis (that is, height from the optical axis). X represents a distance on the optical axis from that origin point. R represents a radius of curvature, K represents a conic constant, and A4, A6, and A8 represent the high order aspheric coefficients. Note that, as the curvature radius R, the value shown in FIG. 3(A) is used.

FIG. 3(B) shows aspheric coefficient of the surface S11. In FIG. 3(B), value of the conic constant K and values of the high order aspheric coefficients A4, A6, and A8 for the surface S11 are shown. Similarly, FIG. 3(C) shows the aspheric coefficient of the surface S12.

In the lens unit 100 of this embodiment, the focal length f is 1.15 mm, the F number is 2.8, and the field angle 2ω is 180 degrees.

Also, in the lens unit 100 of this embodiment, the first evaluation value H1/2Y is 1.76, the second evaluation value H1/R1 is 0.43, and the third evaluation value ΣD/2Y is 7.51.

Here, H1 is an effective radius of an object side surface of the first lens L1 provided on the furthest object side of the first lens group 110 (see FIG. 2). Note that the effective radius is determined considering the dimensions of the part that cannot be used as the lens due to the existence of the lens holder. 2Y is a diameter of an image circle formed on the image surface IS by means of the lens unit 100 (see FIG. 2). R1 is a radius of curvature of the object side surface S1 of the first lens L1 (see FIG. 3(A)). ΣD is a distance on the optical axis between the object side surface S1 of the first lens L1 provided on the furthest object side of the first lens group 110 and the image surface IS (see FIG. 2).

Note that the three evaluation values noted above are described later.

A-2. Characteristics of Fisheye Lens Unit:

FIGS. 4(A) and 4(B) show longitudinal aberration of the fisheye lens unit 100. Note that FIGS. 4(A) and 4(B) are the results of simulation.

FIG. 4(A) shows spherical aberration. As is well known, the spherical aberration is a phenomenon of the light rays not gathering at one point on the optical axis. In the drawing, the horizontal axis indicates a distance (mm) from the image surface IS on the optical axis, and the origin point indicates a center point O of the image surface IS (see FIG. 2). The vertical axis indicates an incident height. For example, the incident height "0.0" (origin point) indicates the principal ray that is the center of the bundle of light rays, and the incident height "1.00" indicates the furthest outside light ray of the bundle of light rays.

Solid line graph shows the spherical aberration when light of wavelength 546.07 nm is used. Dotted line graph shows the spherical aberration when light of wavelength 460.00 nm is used. Chain line graph shows the spherical aberration when light of wavelength 656.27 nm is used.

In this embodiment, the lens unit 100 is designed with wavelength 546.07 nm as the standard. Because of this, in the solid line graph shown in FIG. 4(A), the light ray of the incident height "0.0" crosses the optical axis at the center point O of the image surface IS. As shown in the drawing, the displacement from the center point O when using light of each wavelength is about 0.03 mm or less.

FIG. 4(B) shows astigmatism. As is well known, the astigmatism is a phenomenon of a sagittal image point and a tangential (meridional) image point not matching. Here, the tangential image point means an image formation position of the bundle of light rays in a tangential plane containing the principal ray and the optical axis. Also, the sagittal image point means an image formation position of the bundle of light rays in a sagittal plan vertical to the tangential plane. In the drawing, the horizontal axis indicates a distance (mm) along the direction parallel to the optical axis, and the origin point indicates a point on the image surface IS. Note that the positions of the sagittal image point and the tangential image point depend on an incident angle of the light entering the lens unit 100. The vertical axis indicates an incident angle of the light entering the lens unit 100. Dotted line graph marked by the symbol S indicates the sagittal image points, and Chain double-dashed line graph marked by the symbol T indicates the tangential image points.

The two graphs S and T are obtained when light of the wavelength 546.07 nm is used. For example, if the incident angle is 0 degrees, the sagittal image point and the tangential image point match, and these two image points are formed at the center point O of the image surface IS. If the incident angle is 90 degrees, the sagittal image point and the tangential image point are formed at positions separated from the image surface IS, and the tangential image point is formed at a position further separated from the image surface IS than the sagittal image point. Note that the astigmatism is evaluated by a displacement between the tangential image point and the sagittal image point. As shown in the drawing, the displacement when using light of wavelength 546.07 nm is about 0.02 mm or less.

FIGS. 5(A) and 5(B) show distortion of the fisheye lens unit 100. Note that FIGS. 5(A) and 5(B) are the results of simulation.

As is well known, the distortion is a phenomenon of the object and the image not being similar. The horizontal axis shown in FIGS. 5(A) and 5(B) indicates a distortion (%) of an image height. The distortion of image height is represented by $(y-y_0)/y_0 \times 100$, wherein y represents an actual image height and $y_0$ represents an ideal image height. In FIG. 5(A), as the value of the ideal image height $y_0$, used is a normal value, namely, a value according to the projection method represented by $y=f \cdot \tan \theta$ (see curve CZ in FIG. 1) for which distortion is not allowed. On the other hand, in FIG. 5(B), as the value of the ideal image height $y_0$, used is a value according to the equidistant projection method represented by $y=f \cdot \theta$ (see curve C3 in FIG. 1) for which distortion is allowed. The vertical axis indicates an incident angle of the light entering the lens unit 100. The graphs of FIGS. 5(A) and (B) indicate the distortion when using light of wavelength 546.07 nm.

As described previously, the fisheye lens generates distortion intentionally. Accordingly, in FIG. 5(A), the larger the incident angle, the larger the distortion. In this embodiment, the equidistant projection method is used for the lens unit 100. Because of this, in FIG. 5(B), shown is the distortion of image height for which the ideal image height according to the equidistant projection method is used as the standard. As can be understood from FIG. 5(B), the distortion of image height is within about 1.5%.

FIGS. 6(A)-6(D) show transverse aberration of the fisheye lens unit 100. Note that FIGS. 6(A)-6(D) are the result of simulation.

As is well known, the transverse aberration is aberration on the image surface, and includes coma aberration and chromatic aberration of magnification, and the like. The coma aberration is a phenomenon of the point image drawing tail outside the optical axis, and the chromatic aberration of magnification is a phenomenon of the magnification differing according to the light wavelength.

FIGS. 6(A)-6(D) respectively show the transverse aberration when the incident angle of the light entering the lens unit 100 is 90 degrees, 60 degrees, 30 degrees, and 0 degrees.

Each figure at the left side of FIGS. 6(A)-6(D) shows the transverse aberration at the tangential plane, and each figure at the right side shows the transverse aberration at the sagittal plane. Note that the transverse aberration at the sagittal plane is symmetrical in relation to the vertical axis, and the illustration is simplified.

The horizontal axis indicates a position of each light ray constituting the bundle of light rays on the entrance pupil surface. For example, the origin point represents the principal ray, and the point farthest separated from the origin point represents the light ray farthest outside the bundle of light rays on the entrance pupil surface. The vertical axis indicates a distance (mm) between a reference point on the image surface IS and an intersection point at which each light ray constituting the bundle of light rays crosses the image surface IS. Here, the reference point is a point at which the principal ray of wavelength 546.07 nm crosses the image surface IS. Note that in FIGS. 6(A)-6(D), because the incident angles of the principal rays of wavelength 546.07 nm are mutually different, the reference points on the image surface IS are at mutually different positions.

Solid line graph shows the transverse aberration when using light of wavelength 546.07 nm. Dotted line graph shows transverse aberration when using light of wavelength 460.00 nm. Chain line graph shows transverse aberration when using light of wavelength 656.27 nm.

As mentioned above, the point at which the principal ray of wavelength 546.07 nm crosses the image surface IS is set as the reference point, so for each of FIGS. 6(A)-6(D), the solid line graph passes through the origin point. As shown in the drawing, the displacement from the reference point when using light of each wavelength is about 0.0125 mm or less.

As described above, in the lens unit 100 of this embodiment, both surfaces S11 and S12 of the sixth lens L6 arranged at the furthest image side of the second lens group 120 have aspheric shapes. Accordingly, it is possible to constitute the lens unit 100 that employs the equidistant projection method (y=f·θ) using relatively few lenses (specifically, six lenses). It is also possible to obtain the lens unit 100 with little aberration and with little distortion of image height which uses as the standard the ideal image height according to the projection method that is employed.

B. Second Embodiment

Figures 7, 8A, 8B:
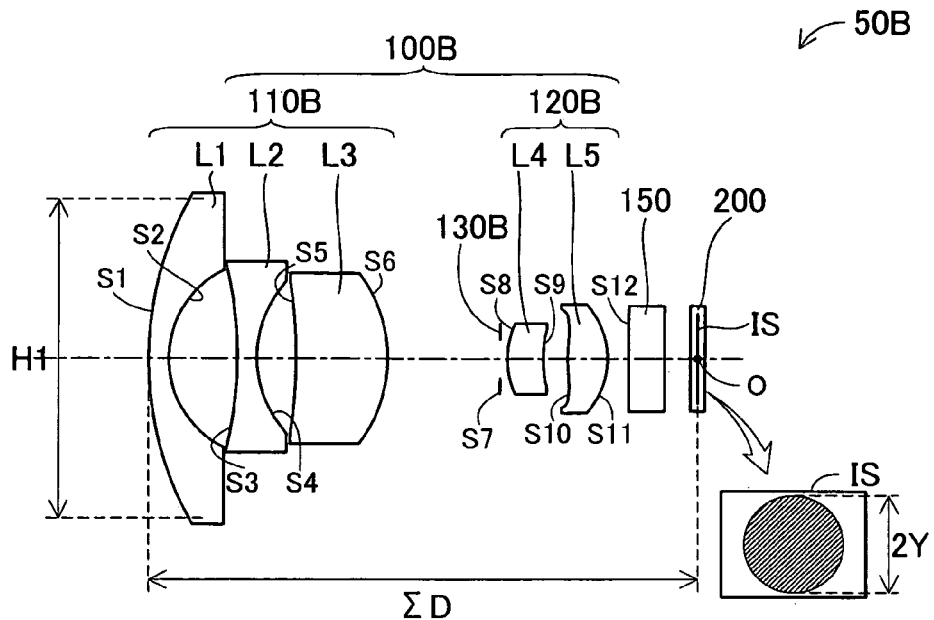
FIG. 7 shows basic configuration of an imaging apparatus 50B according to the second embodiment.
FIGS. 8(A) and 8(B) show lens data of the fisheye lens unit 100B.

B-1. Configuration of Fisheye Lens Unit:

FIG. 7 shows basic configuration of an imaging apparatus 50B according to the second embodiment. FIG. 7 is similar to FIG. 2, but the lens unit 100B is modified. In this embodiment, similar to the first embodiment, the equidistant projection method represented by y=f·θ (see curve C3 in FIG. 1) is used for the lens unit 100B.

The lens unit 100B, similar to the first embodiment, includes a first lens group 110B arranged on the object side, a second lens group 120B arranged on the image side, and an aperture stop 130B arranged between the first lens group 110B and the second lens group 120B.

The first lens group 110B is constituted by three lenses. The first lens L1 is a concave meniscus lens that has a convex surface on the object side and has a concave surface on the image side. The second lens L2 is a biconcave lens that has concave surfaces on both the object side and the image side. The third lens L3 is a convex meniscus lens that has a concave surface on the object side and a convex surface on the image side.

The second lens group 120B is constituted by two lenses. The fourth lens L4 is a convex meniscus lens that has a convex surface on the object side and has a concave surface on the image side. The fifth lens L5 is an aspheric lens that has an aspheric shaped concave surface on the object side and has a spherical shaped convex surface on the image side.

FIGS. 8(A) and 8(B) show lens data of the fisheye lens unit 100B. FIG. 8(A) corresponds to FIG. 3(A). In this embodiment, the object side surface S10 of the fifth lens L5 has an aspheric shape. FIG. 8(B), similar to FIGS. 3(B) and 3(C), shows aspheric coefficient of the surface S10.

In the lens unit 100B of this embodiment, the focal length f is 1.15 mm, the F number is 2.8, and the field angle 2ω is 180 degrees.

Also, in the lens unit 100B of this embodiment, the first evaluation value H1/2Y is 1.73, the second evaluation value H1/R1 is 0.36, and the third evaluation value ΣD/2Y is 6.35. Note that these three evaluation values are described later.

B-2. Characteristics of Fisheye Lens Unit:

FIGS. 9(A) and 9(B) show longitudinal aberration of the fisheye lens unit 100B. FIGS. 9(A) and 9(B) respectively correspond to FIGS. 4(A) and 4(B). As shown in FIG. 9(A), the displacement from the center point O when using light of each wavelength is about 0.03 mm or less. Also, as shown in FIG. 9(B), the displacement when using light of wavelength 546.07 nm is about 0.05 mm or less.

FIGS. 10(A) and 10(B) show distortion of the fisheye lens unit 100B. FIGS. 10(A) and 10(B) respectively correspond to FIGS. 5(A) and 5(B). As can be understood from FIG. 10(B), the distortion of image height which uses as the standard the ideal image height according to the equidistant projection method (y=f·θ) is within about 1.5%.

FIGS. 11(A)-11(D) show transverse aberration of the fisheye lens unit 100B. FIGS. 11(A)-11(D) respectively correspond to FIGS. 6(A)-6(D). As shown in the drawing, the displacement from the reference point when using light of each wavelength is about 0.03 mm or less.

As described above, for the lens unit 100B of this embodiment, the object side surface S10 of the fifth lens L5 arranged at the farthest image side of the second lens group 120 has an aspheric shape. Accordingly, it is possible to constitute the lens unit 100B that employs the equidistant projection method (y=f·θ) using relatively few lenses (specifically, five lenses). It is also possible to obtain a lens unit 100B with little aberration and with little distortion of image height which uses as the standard the ideal image height according to the projection method that is employed.

C. Third Embodiment

Figures 12, 13A, 13B, 13C:
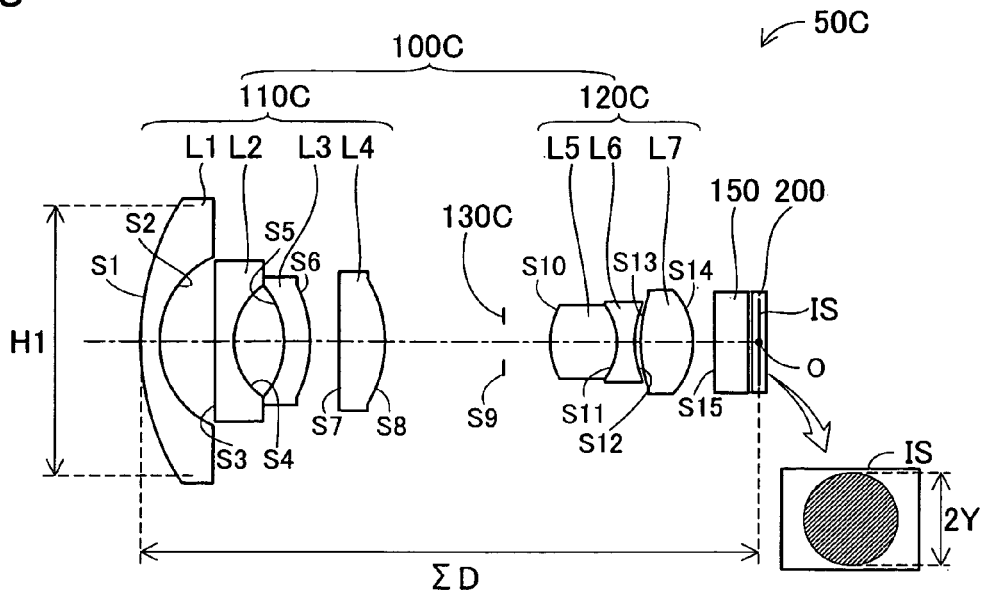
FIG. 12 shows basic configuration of an imaging apparatus 50C according to the third embodiment.
FIGS. 13(A)-13(C) show lens data of the fisheye lens unit 100C.

C-1. Configuration of Fisheye Lens Unit:

FIG. 12 shows basic configuration of an imaging apparatus 50C according to the third embodiment. FIG. 12 is similar to FIG. 2, but the lens unit 100C is modified. In this embodiment, in contrast to the first and second embodiments, the projection method represented by y=3·f·tan(θ/3) (see curve CA in FIG. 1) is used for the lens unit 100C.

The lens unit 100C, similar to the first embodiment, includes a first lens group 110C arranged at the object side, a second lens group 120C arranged at the image side, and an aperture stop 130C arranged between the first lens group 110C and the second lens group 120C.

The first lens group 110C is constituted by four lenses. The first lens L1 is a concave meniscus lens that has a convex surface on the object side and has a concave surface on the image side. The second lens L2 is a plano-concave lens that has a planar surface on the object side and a concave surface on the image side. The third lens L3 is a concave meniscus lens that has a concave surface on the object side and has a convex surface on the image side. The fourth lens L4 is a convex meniscus lens that has a concave surface on the object side and has a convex surface on the image side.

The second lens group 120C is constituted by three lenses. The fifth lens L5 is a biconvex lens that has convex surfaces on both the object side and the image side. The sixth lens L6 is a biconcave lens that has concave surfaces on both the object side and the image side. The seventh lens L7 is an aspheric lens that has an aspheric shaped convex surface on both the object side and the image side. Note that the fifth lens L5 and the sixth lens L6 are joined.

FIGS. 13(A)-13(C) shows lens data of the fisheye lens unit 100C. FIG. 13(A) corresponds to FIG. 3(A). In this embodiment, each of the object side surface S13 and the image side surface S14 of the seventh lens L7 has an aspheric shape. Similar to FIGS. 3(B) and 3(C), FIGS. 13(B) and 13(C) respectively show the aspheric coefficient of the surface S13 and the surface S14.

In the lens unit 100C of this embodiment, the focal length f is 1.04 mm, the F number is 2.8, and the field angle 2ω is 180 degrees.

Also, in the lens unit 100C of this embodiment, the first evaluation value H1/2Y is 1.75, the second evaluation value H1/R1 is 0.46, and the third evaluation value ΣD/2Y is 7.57. Note that these three evaluation values are described later.

Figure 14A:
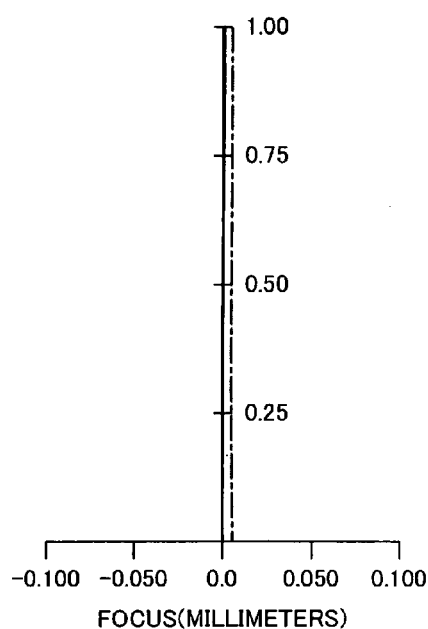
FIGS. 14(A) and 14(B) show longitudinal aberration of the fisheye lens unit 100C.
Figure 14B:
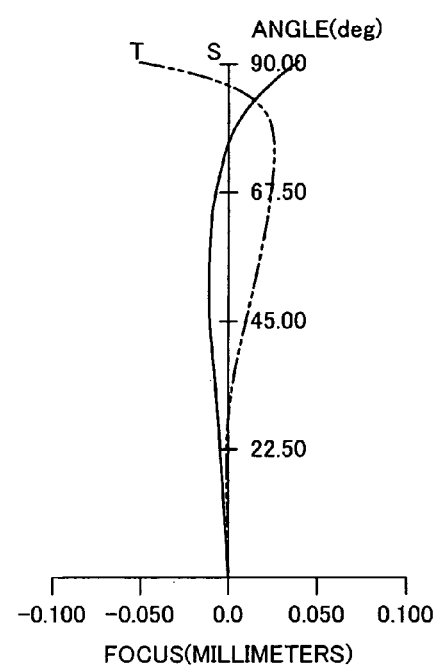

C-2. Characteristics of Fisheye Lens Unit:

FIGS. 14(A) and 14(B) show longitudinal aberration of the fisheye lens unit 100C. FIGS. 14(A) and 14(B) respectively correspond to FIGS. 4(A) and 4(B). As shown in FIG. 14(A), the displacement from the center point O when using light of each wavelength is about 0.01 mm or less. Also, as shown in FIG. 14(B), the displacement when using light of wavelength 546.07 nm is about 0.09 mm or less.

Figure 15A:
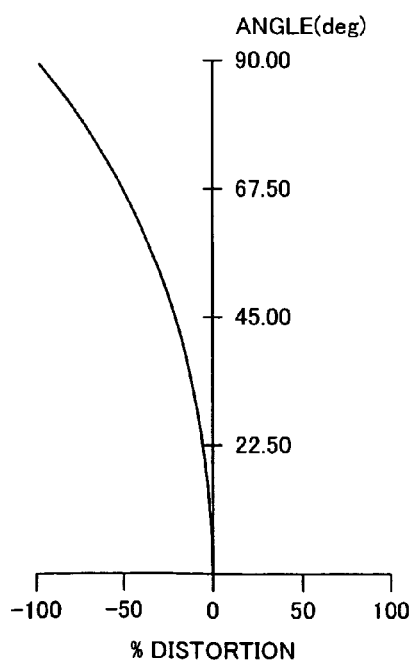
FIGS. 15(A) and 15(B) show distortion of the fisheye lens unit 100C.
Figure 15B:
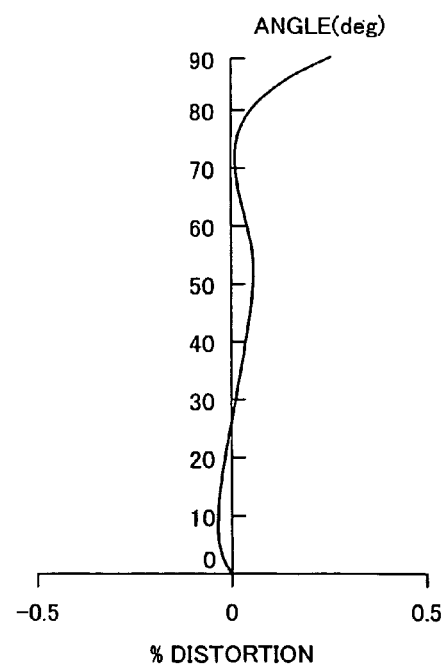

FIGS. 15(A) and 15(B) show distortion of the fisheye lens unit 100C. FIG. 15(A) corresponds to FIG. 5(A). FIG. 15(B) shows the distortion of image height which uses as the standard the ideal image height according to the projection method represented by y=3·f·tan(θ/3). As can be understood from FIG. 15(B), the distortion of image height is within about 0.3%.

FIGS. 16(A)-16(D) show transverse aberration of the fisheye lens unit 100C. FIGS. 16(A)-16(D) respectively correspond to FIGS. 6(A)-6(D). As shown in the drawing, the displacement from the reference point when using light of each wavelength is about 0.02 mm or less.

As described above, for the lens unit 100C of this embodiment, both the surfaces S13 and S14 of the seventh lens L7 arranged at the furthest image side of the second lens group 120C have aspheric shapes. Accordingly, it is possible to constitute the lens unit 100C that employs the projection method represented by y=3·f·tan(θ/3) using relatively few lenses (specifically, seven lenses). It is also possible to obtain the lens unit 100C with little aberration and with little distortion of image height which uses as the standard the ideal image height according to the projection method that is employed.

D. Fourth Embodiment

Figures 17, 18A, 18B, 18C, 18D:
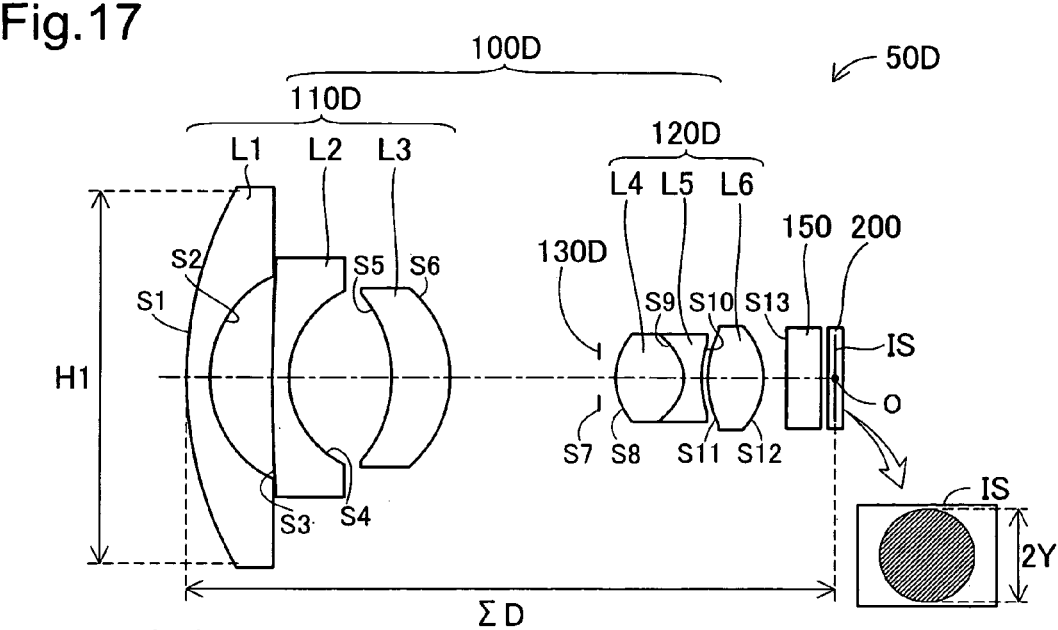
FIG. 17 shows basic configuration of an imaging apparatus 50D according to the fourth embodiment.
FIGS. 18(A)-18(D) show lens data of the fisheye lens unit 100D.

D-1. Configuration of Fisheye Lens Unit:

FIG. 17 shows basic configuration of an imaging apparatus 50D according to the fourth embodiment. FIG. 17 is similar to FIG. 2, but the lens unit 100D is modified. In this embodiment, similar to the third embodiment, the projection method represented by y=3·f·tan(θ/3) (see curve CA of FIG. 1) is used for the lens unit 100D.

The lens unit 100D, similar to the first embodiment, includes a first lens group 110D arranged at the object side, a second lens group 120D arranged at the image side, and an aperture stop 130D arranged between the first lens group 110D and the second lens group 120D.

The first lens group 110D is constituted by three lenses. The first lens L1 is a concave meniscus lens that has a convex surface on the object side and has a concave surface on the image side. The second lens L2 is a concave meniscus lens that has a convex surface on the object side and has a concave surface on the image side. The third lens L3 is an aspheric lens that has an aspheric shaped concave surface on the object side and has an aspheric shaped convex surface on the image side.

The second lens group 120D is constituted by three lenses. The fourth lens L4 is a biconvex lens that has convex surfaces on both the object side and the image side. The fifth lens L5 is a biconcave lens that has concave surfaces on both the object side and the image side. The sixth lens L6 is an aspheric lens that has an aspheric shaped convex surface on both the object side and the image side. Note that the fourth lens L4 and the fifth lens L5 are joined.

FIGS. 18(A)-18(D) show lens data of the fisheye lens unit 100D. FIG. 18(A) corresponds to FIG. 3(A). In this embodiment, the image side surface S6 of the third lens L3 has an aspheric shape. Also, each of the object side surface S11 and the image side surface S12 of the sixth lens L6 has an aspheric shape. Similar to FIGS. 3(B) and 3(C), FIG. 18(B) shows the aspheric coefficient of the surface S6 of the third lens L3, and FIGS. 18(C) and 18(D) respectively show the aspheric coefficients of surface S11 and surface S12 of the sixth lens L6.

In the lens unit 100D of this embodiment, the focal length f is 1.05 mm, the F number is 2.8, and the field angle 2ω is 180 degrees.

Also, in the lens unit 100D of this embodiment, the first evaluation value H1/2Y is 2.13, the second evaluation value H1/R1 is 0.45, and the third evaluation ΣD/2Y is 7.89. Note that the three evaluation values will be described later.

Figure 19A:
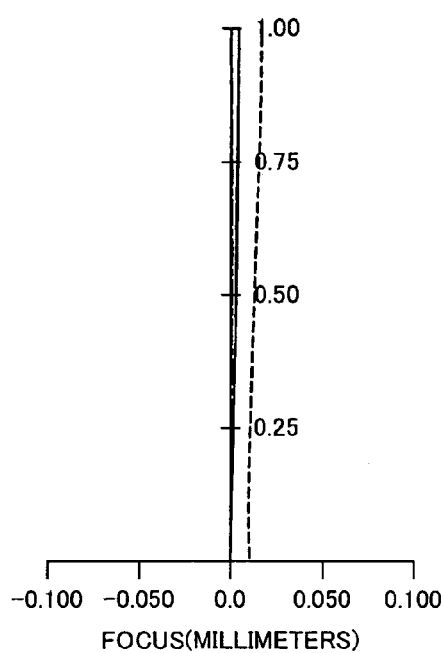
FIGS. 19(A) and 19(B) show longitudinal aberration of the fisheye lens unit 100D.
Figure 19B:
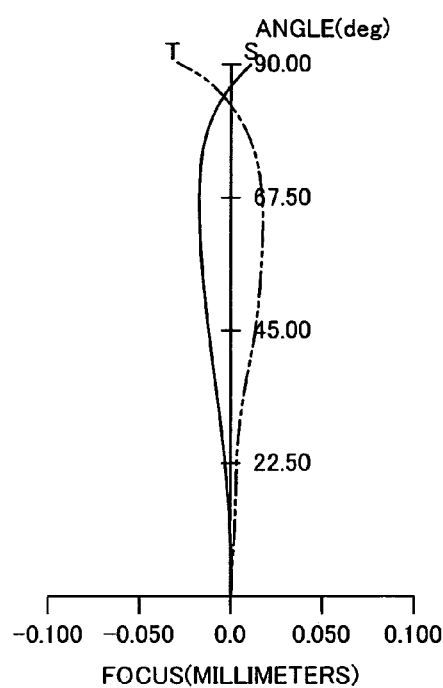

D-2. Characteristics of Fisheye Lens Unit:

FIGS. 19(A) and 19(B) show longitudinal aberration of the fisheye lens unit 100D. FIGS. 19(A) and 19(B) respectively correspond to FIGS. 4(A) and 4(B). As shown in FIG. 19(A), the displacement from the center point O when using light of each wavelength is about 0.015 mm or less. Also, as shown in FIG. 19(B), the displacement when using light of wavelength 546.07 nm is about 0.04 mm or less.

Figure 20A:
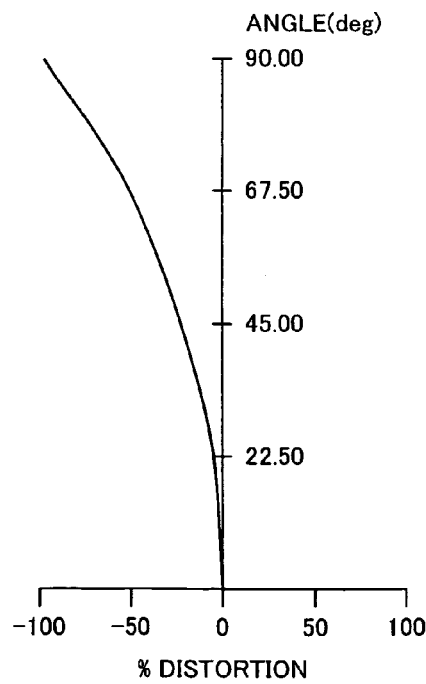
FIGS. 20(A) and 20(B) show distortion of the fisheye lens unit 100D.
Figure 20B:
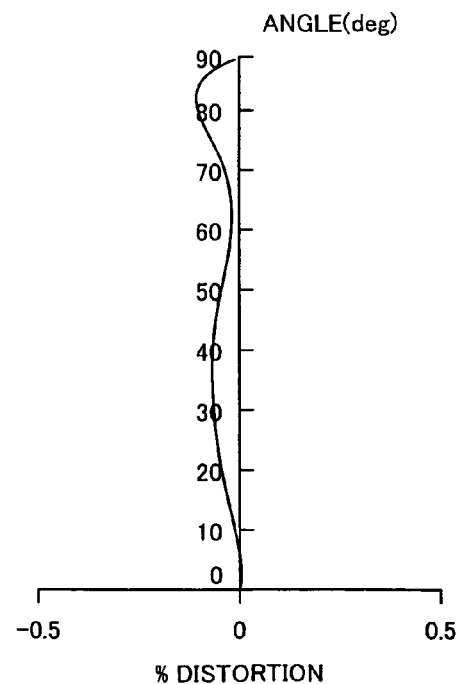
Figure 21A:
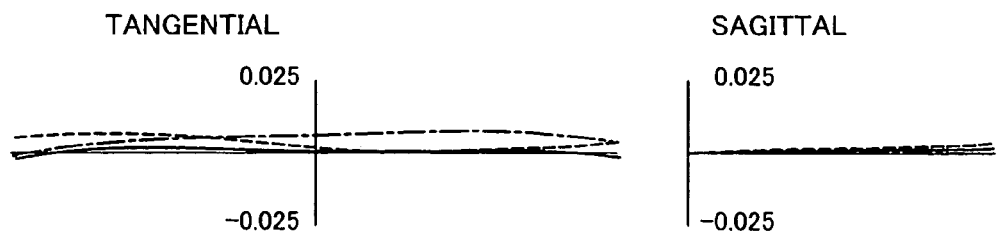
FIGS. 21(A)-21(D) show transverse aberration of the fisheye lens unit 100D.
Figure 21B:
Figure 21C:
Figure 21D:

FIGS. 20(A) and 20(B) show distortion of the fisheye lens unit 100D. FIG. 20(A) corresponds to FIG. 5(A). FIG. 20(B), similar to FIG. 15(B), shows the distortion of image height which uses as the standard the ideal image height according to the projection method represented by y=3·f·tan (θ/3). As can be understood from FIG. 20(B), the distortion of image height is within about 0.1%.

FIGS. 21(A)-21(D) show transverse aberration of the fisheye lens unit 100D. FIGS. 21(A)-21(D) respectively correspond to FIGS. 6(A)-6(D). As shown in the drawing, the displacement from the reference point when using each wavelength is about 0.01 mm or less.

As described above, for the lens unit 100D of this embodiment, both the surface S11 and S12 of the sixth lens L6 arranged at the furthest image side of the second lens group 120D have aspheric shapes. Furthermore, in this embodiment, the image side surface S6 of the third lens L6 arranged at the furthest image side of the first lens group 110D has an aspheric shape. Accordingly, it is possible to constitute the lens unit 100D that employs the projection method represented by y=3·f·tan(θ/3) using relatively few lenses (specifically, six lenses). It is also possible to obtain the lens unit 100D with little aberration and with little distortion of image height which uses as the standard the ideal image height according to the projection method that is employed.

E. Evaluation Values of Fisheye Lens Unit

As described in the first through fourth embodiments, the first evaluations value H1/2Y for the lens units 100, 100B, 100C, and 100D are respectively 1.76, 1.73, 1.75, and 2.13, and satisfy the following condition (a).

Condition (a): $1.5 < H1/2Y < 2.5$

If the first evaluation value H1/2Y is the upper limit (2.5) or greater, the diameter of the first lens L1 becomes large. Also, if the first evaluation value H1/2Y is the lower limit (1.5) or less, correction of off-axis aberration such as astigmatism and coma aberration becomes difficult.

However, in each lens unit 100, 100B, 100C, and 100D, because the condition (a) is satisfied, it is possible to make the first lens L1 smaller in diameter. It is also possible to correct the off-axis aberration relatively easily, and as a result, it is possible to obtain a high performance lens unit with little off-axis aberration.

Also, the second evaluation values H1/R1 for the lens units 100, 100B, 100C, and 100D are respectively 0.43, 0.36, 0.46, and 0.45, and satisfy the following condition (b).

Condition (b): $0.25 < H1/R1 < 0.5$

If the second evaluation value H1/R1 is the upper limit (0.5) or greater, the object side surface S1 of the first lens L1 projects greatly to the object side, so it is very difficult to produce the first lens L1, and handling of the first lens L1 is also inconvenient. Furthermore, if the object side surface S1 of the first lens L1 greatly projects to the object side, it is easy for ghost and flare to occur due to stray light. Also, if the second evaluation value H1/R1 is the lower limit (0.25) or less, the bundle of light rays near the incident angle 90 degrees enters the object side surface S1 of the first lens L1 at a very steep angle, so there is a great deal of refraction. Because of this, it is difficult to correct off-axis aberration such as astigmatism and chromatic aberration of magnification that occurs due to this refraction, and it is also difficult to ensure sufficient amount of peripheral light.

However, in each lens unit 100, 100B, 100C, and 100D, because the condition (b) is satisfied, it is possible to produce the first lens L1 relatively easily, and also to handle it relatively easily. It is also possible to reduce the occurrence of ghost and flare. Furthermore, the bundle of light rays near the incident angle 90 degrees enters the object side surface S1 of the first lens L1 at a relatively gentle angle. Because of this, it is possible to reduce the off-axis aberration relatively easily, and as a result, it is possible to obtain a high performance lens unit with little off-axis aberration. It is also possible to ensure sufficient amount of peripheral light.

Furthermore, the third evaluation values ΣD/2Y for the lens units 100, 100B, 100C, and 100D are respectively 7.51, 6.35, 7.57, and 7.89, and satisfy the following condition (c).

Condition (c): $6.0 < \Sigma D/2Y < 8.0$

If the third evaluation value ΣD/2Y is the upper limit (8.0) or greater, the lens unit becomes larger. Also, if the third evaluation value ΣD/2Y is the lower limit (6.0) or less, the power of each lens becomes larger, and correction of spherical aberration, coma aberration, astigmatism, chromatic aberration of magnification and the like becomes difficult. It is also possible to obtain a sufficient field angle (e.g. 180 degrees) while using the projection method represented by $y = f \cdot \theta$, $y = 3 \cdot f \cdot \tan(\theta/3)$ or the like.

However, in each lens unit 100, 100B, 100C, and 100D, because the condition (c) is satisfied, it is possible to make the lens unit more compact. It is also possible to correct spherical aberration, coma aberration, astigmatism, chromatic aberration of magnification and the like relatively easily, and as a result, it is possible to obtain a high performance lens unit with little of any of the aberrations. Furthermore, it is possible to obtain a sufficient field angle easily while using the projection method represented by $y = f \cdot \theta$, $y = 3 \cdot f \cdot \tan(\theta/3)$ or the like.

The invention is not limited to the above examples and embodiments set forth hereinabove, and can be reduced to practice in various ways without departing from the spirit thereof, such as the following variations, for example.

(1) In the first and second embodiment, the fisheye lens units employ the equidistant projection method represented by $y = f \cdot \theta$, and in the third and fourth embodiments, the fisheye lens units employ the projection method represented by $y = 3 \cdot f \cdot \tan(\theta/3)$, but it is also possible to use other projection methods. For example, it is possible to use a projection method represented by $y = \alpha \cdot f \cdot \tan(\theta/\beta)$ such as the stereographic projection method ($y = 2 \cdot f \cdot \tan(\theta/2)$). Note that, as the β value, it is possible to use any positive value greater than 1 (e.g. a positive value of 2 or more). However, as the β value, any positive value greater than 1.5 is typically used. Also, as the α value, it is possible to use a value that satisfies $0.9\beta \leq \alpha \leq 1.1\beta$, for example.

Namely, the fisheye lens unit of the present invention will use a predetermined projection method represented by the aforementioned $y = f \cdot \theta$ or $y = \alpha \cdot f \cdot \tan(\theta/\beta)$. In other words, the fisheye lens unit of the present invention will use a predetermined projection method for which a variation (Δy/Δθ) expressed by an increment of the image height in relation to an increment of the incident angle at a predetermined incident angle (e.g. 80 degrees) is not less than the variation for the equidistant projection method.

(2) In the first, second, and fourth embodiments, the first lens group provided on the object side is constituted by three lenses, and in the third embodiment, the first lens group is constituted by four lenses.

Also, in the first, third, and fourth embodiments, the second lens group provided on the image side is constituted by three lenses, and in the second embodiment, the second lens group is constituted by two lenses.

Generally, the first lens group provided on the object side will be constituted by three or four lenses. Also, the second lens group provided on the image side will be constituted by two or three lenses.

(3) In the first, third, and fourth embodiments, the aspheric lens provided at the furthest image side of the second lens group has aspheric shapes on both surfaces. Also, in the second embodiment, the aspheric lens has an aspheric shape on only the object side surface. Instead of this, the aspheric lens may have an aspheric shape on only the image side surface. In the case where the aspheric lens has an aspheric shape on only one surface, the aspheric lens can be relatively easily produced, compared with the case where the aspheric lens has aspheric shapes on both surfaces.

Generally, a final lens provided on the furthest image side of the second lens group will be an aspheric lens that has an aspheric shape on at least one of two surfaces of the aspheric lens.

(4) In the above embodiments, the imaging apparatus including the fisheye lens unit is explained. The imaging apparatus can be applied to a still camera or a monitoring camera, for example.

Also, in the above embodiments, a substantially circular image having distortion is formed on the image surface IS of the solid-state imaging device 200 of the imaging apparatus. The imaging apparatus may further include a processing circuit for processing the substantially circular image obtained by the solid-state imaging device 200. The processing circuit may correct the substantially circular image based on the projection method of the fisheye lens unit, for example. By doing this, it is possible to obtain an image without distortion.

(5) In the above embodiments, the fisheye lens unit is applied to the imaging apparatus, but instead of this, may be applied to a projection apparatus such as a projector.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fisheye lens unit that uses a predetermined projection method, wherein a variation for the predetermined projection method is not less than the variation for an equidistant projection method, the variation being expressed by an increment of an image height in relation to an increment of an incident angle at a predetermined incident angle, the fisheye lens unit comprising:
   a first lens group provided on an object side;
   a second lens group provided on an image side; and
   an aperture stop provided between the first lens group and the second lens group,
   wherein the first lens group consists of three or four lenses,
   the second lens group consists of two or three lenses including a final lens provided on the furthest image side of the second lens group, and
   the final lens is an aspheric lens that has an aspheric shape on each of two surfaces of the aspheric lens.

2. A fisheye lens unit that uses a predetermined projection method, wherein a variation for the predetermined projection method is not less than the variation for an equidistant projection method, the variation being expressed by an increment of an image height in relation to an increment of an incident angle at a predetermined incident angle, the fisheye lens unit comprising:
   a first lens group provided on an object side;
   a second lens group provided on an image side; and
   an aperture stop provided between the first lens group and the second lens group,
   wherein the first lens group consists of three or four lenses,
   the second lens group consists of two or three lenses including a final lens provided on the furthest image side of the second lens group, and
   the final lens is an aspheric lens that has an aspheric shape on at least one of two surfaces of the aspheric lens,
   and wherein a condition of $1.5<H1/2Y<2.5$ is satisfied, H1 being an effective radius of a object side surface of a first lens provided on the furthest object side of the first lens group, and 2Y being a diameter of an image circle formed on an image surface by the fisheye lens unit.

3. A fisheye lens unit that uses a predetermined projection method, wherein a variation for the predetermined projection method is not less than the variation for an equidistant projection method, the variation being expressed by an increment of an image height in relation to an increment of an incident angle at a predetermined incident angle, the fisheye lens unit comprising:
   a first lens group provided on an object side;
   a second lens group provided on an image side; and
   an aperture stop provided between the first lens group and the second lens group,
   wherein the first lens group consists of three or four lenses,
   the second lens group consists of two or three lenses including a final lens provided on the furthest image side of the second lens group, and
   the final lens is an aspheric lens that has an aspheric shape on at least one of two surfaces of the aspheric lens,
   and wherein a condition of $0.25<H1/R1<0.5$ is satisfied, H1 being an effective radius of a object side surface of a first lens provided on the furthest object side of the first lens group, and R1 being a radius of curvature of the object side surface of the first lens.

4. A fisheye lens unit that uses a predetermined projection method, wherein a variation for the predetermined projection method is not less than the variation for an equidistant projection method, the variation being expressed by an increment of an image height in relation to an increment of an incident angle at a predetermined incident angle, the fisheye lens unit comprising:
   a first lens group provided on an object side;
   a second lens group provided on an image side; and
   an aperture stop provided between the first lens group and the second lens group,
   wherein the first lens group consists of three or four lenses,
   the second lens group consists of two or three lenses including a final lens provided on the furthest image side of the second lens group, and
   the final lens is an aspheric lens that has an aspheric shape on at least one of two surfaces of the aspheric lens,
   and wherein a condition of $6.0<\Sigma D/2Y<8.0$ is satisfied, $\Sigma D$ being a distance on an optical axis between a object side surface of a first lens provided on the furthest object side of the first lens group and an image surface, and 2Y being a diameter of an image circle formed on the image surface by the fisheye lens unit.

5. An imaging apparatus comprising:
   the fisheye lens unit in accordance with claim 1; and
   an imaging device.

* * * * *